April 14, 1931.   F. TABATT   1,801,122
END GATE ROD FOR WAGON BOXES
Filed Nov. 4, 1927
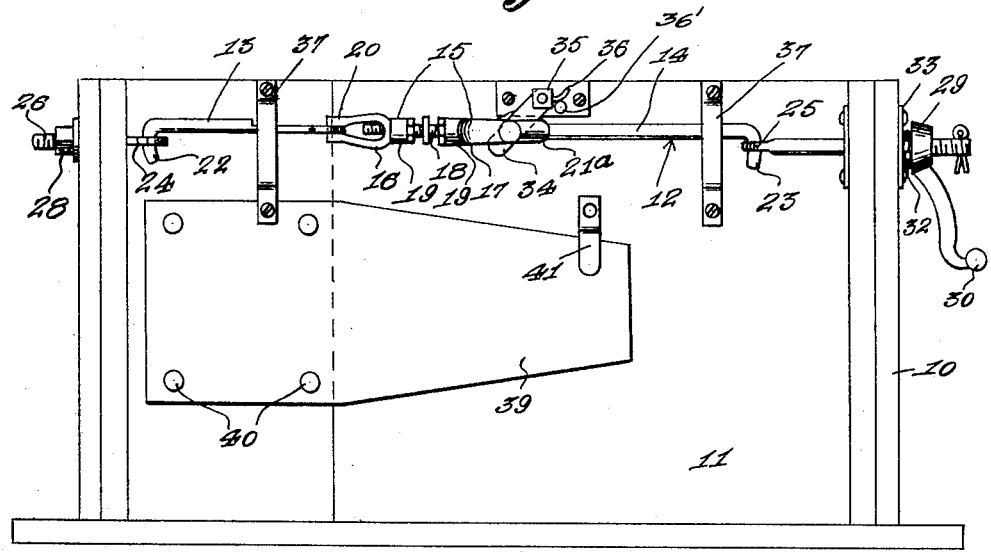
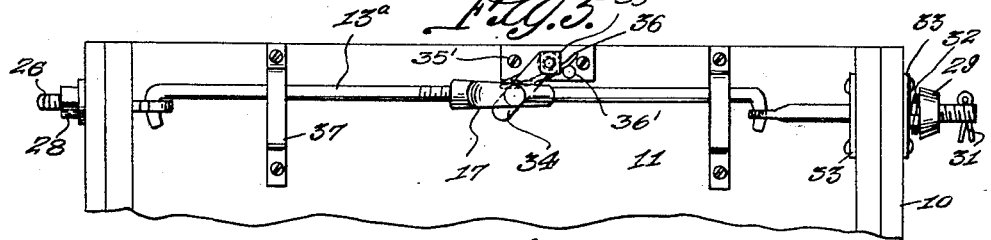
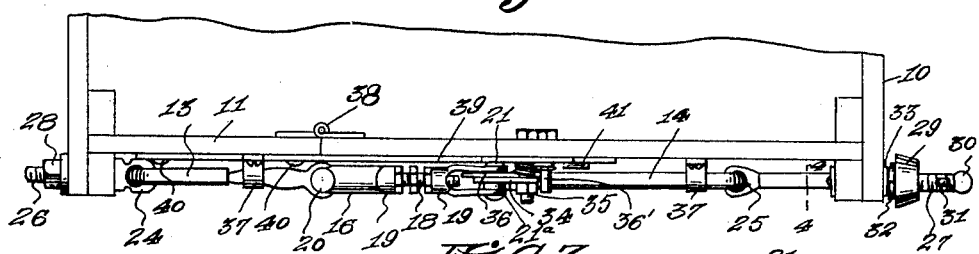
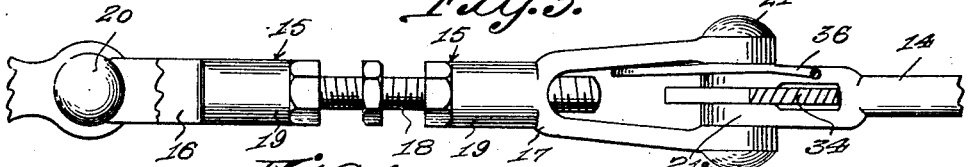
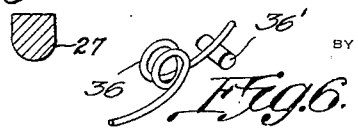

Patented Apr. 14, 1931

1,801,122

UNITED STATES PATENT OFFICE

FRIEBERT TABATT, OF AMBOY, MINNESOTA

END-GATE ROD FOR WAGON BOXES

Application filed November 4, 1927. Serial No. 231,078.

The present invention relates to end gate rods for wagon boxes and has for its objects to provide a rod whereby the end gate may be secured in place and clamped against displacement in a simple and effective manner and which may be adjusted to various conditions and widths of wagons.

A further object is to provide an end gate rod which may be maintained in place upon the end gate and which will normally assume a given position from which it may be drawn against tension in adjusting the same.

Further objects and advantages will appear from the following description and will be set forth in the subjoined claims, and I do not wish to be limited in the scope of my invention except as I shall be limited by said claims.

In the drawings:

Figure 1 is an end elevation of a wagon box showing my invention applied to the end gate thereof.

Figure 2 is a fragmentary end elevation illustrating a modified form of my invention.

Figure 3 is an enlarged view showing certain portions of the rod.

Figure 4 is a section on the line 4—4 of Figure 2, showing the cross section of one of the adjusting elements.

Figure 5 is a view similar to Figure 1, showing the invention adapted to a different form of end gate and eliminating certain of the construction.

Figure 6 is a view illustrating the arrangement of a spring which forms a part of my invention and which is adapted for holding the gate rod in normal position.

Referring to the drawings in detail, 10 designates a wagon box, 11 the end gate mounted thereon and 12 is the end gate rod constituting the subject of my invention. The rod is made up of two parts 13 and 14 secured together by means of a swivel connection at 15, comprising links 16 and 17 adjustably secured together by the rod 18, having oppositely directed screw threads at its opposite ends in cooperative connection with the threaded sleeves 19 secured to the links 16 and 17, the links 16 and 17 being in the form of spaced arms and having pivotal connection at 20 and 21 with the members 13 and 14 that are arranged between the arms as clearly shown in Figure 3. The members 13 and 14 are provided at their free ends with hooks 22 and 23 adapted to hook into the eyes 24 and 25 of the adjusting bolts 26 and 27 which pass through apertures in the sides of the wagon box and are provided with nuts 28 and 29 for holding them in adjusted position relative to the sides of the wagon box, the nut 29 having a handle 30 thereon by which it may be turned for adjustment. The nut 29 is prevented from accidental removal from the member 27 by means of a cotter pin 31 extending through an aperture therein. A split washer 32 may be provided between the nut 29 and the wagon box, the latter being preferably provided with plates 33 to prevent wear.

The member 14 terminates at its inner end in a fork 21ª that receives the pivotal connection 21 which has pivotally secured thereto one end of a lever member 34, the opposite end thereof being pivotally secured to the end gate by a bolt and nut connection 35, the bolt passing through a wear plate 35' secured to the gate and the lever member 34 is disposed between the arms of the fork. A coil spring 36 is coiled about the bolt of the bolt and nut connection 35 and has one end engaging a pin 36' which extends from the wear plate 35' in the path thereof, while its opposite end engages the fork of the member 14, whereby the rod 12 is spring pressed in one direction so that when the rod is unhooked from the eyes 24 and 25 it is held substantially centrally of the end gate and out of contact with the wagon box when the gate is being taken out or replaced. The rod 12 is provided with guide straps 37 that are of a size to allow vertical play of said rod upon movement of the lever member 34 on its pivot as will be apparent.

The end gate as illustrated in Figures 1 and 2 is of the type in which one part thereof is hinged to the other, as shown at 38 in Figure 2, for facilitating the removal thereof from the wagon body, the outside of the end gate having a member 39 mounted thereon and secured to one of said sections by suitable means, as by bolts 40 shown in Figure 1, and the opposite end of the member 39 may be latched to the other portion of the end gate by means of a rotatable latch member 41.

The type of end gate as illustrated in Figure 5 is made in one single section and the connection at 20 in Figure 1 may be dispensed with, inasmuch as there is no part of the end gate having movement relative to the other. In this case the hook member is modified, as shown at 13a in Figure 5, and the link 15 is eliminated, the end of the member 13ª being connected directly to the link 17.

The operation of the device is as follows: the members 26 and 27 are located in the apertures prepared therefor and the member 26 is adjusted to the desired position. When the end gate is inserted in the slot of the wagon box prepared therefor, the rod member 12 may be lifted and the hook 22 inserted in the eye 24 of the member 26, the opposite hooked end 23 being connected in the eye 25, whereup the arm 30 may be rotated, drawing the member 12 to the right and tightening the box to prevent accidental removal of the end gate, the end gate being connected with the rod member through straps 37 and by means of the link 34. When it is desired to remove the end gate, the arm 30 is rotated in the opposite direction, loosening the tension on the member 12 and permitting the removal of the hooked ends thereof from the eyes of the members 26 and 27.

Having described my invention, what I claim is:

1. A wagon end gate latch comprising a rod including two parts, each part having a hook formed at one end, straps secured to an end gate and receiving said parts for slidable movement horizontally and for vertical play, means connecting together the parts at their opposite ends in alignment with each other and including spaced arms, a pivot between the two arms and being included in the connecting means, a lever member having one end pivotally connected to the pivot, a bolt and nut connection secured to the gate and pivotally receiving the opposite end of the lever member, a spring surrounding the bolt of the bolt and nut connection and having one end engageable with the lever member for urging the rod in one direction, and adjusting bolts having eyed ends for receiving the hooks of the parts to secure the gate to a wagon box.

2. An end gate latch comprising a rod including two parts having hooks on one of the ends thereof, straps secured to an end gate and receiving the parts for slidable movement therethrough horizontally and for vertical play, means connecting the parts at their opposite ends and including links each having spaced arms pivotally receiving the parts, threaded sleeves formed with said spaced arms, a threaded rod threadedly secured in said sleeves for adjusting the links with respect to each other, one of said parts terminating at its inner end in a fork received by the pivot that connects the last mentioned part with its link, a lever member having one end pivotally secured to the pivot, a bolt and nut connection pivotally receiving the opposite end of said lever member, a spring engageable with the lever member for urging the first mentioned rod in one direction and to normally hold the same with the hooks between the ends of the gate, adjusting bolts having eyes and adapted to receive the hooks for securing the gate to a wagon box, nuts for said adjusting bolts and a handle for one nut.

In testimony whereof I affix my signature.
FRIEBERT TABATT.